United States Patent [19]

Martin, Sr.

[11] Patent Number: 5,417,900
[45] Date of Patent: May 23, 1995

[54] VACUUM LEAK DETECTOR FOR A TIRE CURING PRESS

[75] Inventor: Rodney A. Martin, Sr., Murfreesboro, Tenn.

[73] Assignee: Bridgestone/Firestone, Inc., Akron, Ohio

[21] Appl. No.: 88,018

[22] Filed: Jul. 7, 1993

[51] Int. Cl.⁶ .............................................. B29C 35/04
[52] U.S. Cl. .................... 264/40.5; 264/315; 264/326; 425/29; 425/136; 425/162; 425/173
[58] Field of Search ............... 264/40.5, 315, 326; 425/29, 136, 154, 171, 173, 162, 170

[56] References Cited

U.S. PATENT DOCUMENTS

| | | | |
|---|---|---|---|
| 3,632,712 | 1/1972 | Miller | 264/326 |
| 3,859,015 | 1/1975 | O'Brien, Jr. | 425/29 |
| 3,942,922 | 3/1976 | Cole et al. | 425/30 |
| 4,222,721 | 9/1980 | Gado | 425/33 |
| 4,502,857 | 3/1985 | Hinks | 425/29 |
| 4,721,590 | 1/1988 | Trapp | 264/40.5 |
| 4,744,931 | 5/1988 | Trapp | 264/40.5 |
| 5,238,643 | 8/1993 | Kobayashi | 264/326 |

FOREIGN PATENT DOCUMENTS

| | | | |
|---|---|---|---|
| 57-142341 | 9/1982 | Japan | 425/29 |
| 5-77249 | 3/1993 | Japan | 264/326 |
| 1558687 | 4/1990 | U.S.S.R. | 425/29 |

*Primary Examiner*—Mathieu D. Vargot
*Attorney, Agent, or Firm*—David A. Thomas

[57] ABSTRACT

A curing press for tires or other curable articles, has a fluid inlet line for supplying curing fluid into an inflatable elastomeric bladder mounted within the press cavity for curing a green tire or article in the cavity. The spent curing fluid is removed from the bladder after a curing operation by a pump through an exhaust line. A venturi ejector in the exhaust line causes a vacuum to be created within the bladder as the fluid is being removed during an unload cycle. A vacuum sensor is connected to the exhaust line and if a predetermined vacuum strength is not reached within a predetermined time, which indicates that leak exists, appropriate control circuitry is actuated to prevent loading of the next green tire or article into the press. The invention also incorporates the method for detecting a leak by measuring the strength of the vacuum created upon removal of the spent curing fluid after each curing cycle.

8 Claims, 1 Drawing Sheet

VACUUM LEAK DETECTOR FOR A TIRE CURING PRESS

BACKGROUND OF THE INVENTION

1. Technical Field

The invention relates to tire making equipment and in particular to the curing press in which a green tire is placed and cured through use of an elastomeric inflatable bladder. More particularly, the invention relates to a tire curing press and to a control system therefore which determines whether there is a leak in the tire curing bladder or other portion of the curing fluid supply and exhaust system after each curing cycle, and to the means for preventing the start of the next curing cycle if a leak is detected.

2. Background Information

In the manufacture of pneumatic tires or other elastomeric articles such as air spring bladders, etc., the article is placed into a curing press wherein an inflatable bladder which is supplied with a heated curing fluid expands outwardly and presses the green elastomeric article against the inner surfaces of the mold where it is subsequently heated for a predetermined time until the article cures. After the desired cure has been achieved, appropriate control mechanisms open a drain line to the press which removes the spent curing fluid. This deflates the curing bladder, afterwhich, the mold is open and the cured tire or article removed therefrom. Another green tire or article then is placed in the press for a subsequent curing operation.

During the curing of the article and in particular pneumatic tires, it is critical that the desired curing pressure be maintained in order to properly cure the tire. Occasionally, a leak develops in the bladder and/or fluid inlet and outlet fluid lines causing leaks, which if undetected, result in an ineffective curing of the tire, which is subsequently scrapped after detection, which then indicates that a leak has developed in the system.

Heretofore, several tires would have been produced prior to the leak being detected during the subsequent inspection of the cured tires. This results in several scrap tires being produced as well as resulting in needless expense and time. The defect in the tires is caused by the curing fluid coming into contact with the tire, causing imperfections in the final cured tire.

Prior art leak detection systems generally use pressure actuated switches which were tripped upon detecting an excess amount of steam or water during the load or curing cycle. This requires some clean-up periodically to clean the pressure switch and attached lines so that a free flow of fluid to the pressure switch can be maintained.

Some examples of prior art systems for detecting malfunctions in a tire curing press are shown in the following patents.

U.S. Pat. No. 3,859,015 discloses a device for detecting the shape of a green tire as it is being formed in a tire mold. Fluidic sensors sense the expanding position of the green tire as it is being formed in the mold press. The sensors are triggered and send signals to a control box which will interrupt the flow of steam into the shaping bladder. Also, a warning device will notify the operator if a reversing signal has not been produced which indicates a leaking bladder within the tire press.

U.S. Pat. No. 3,942,922 discloses a tire press and a mold leak control system wherein the pressure of the fluid medium in the tire cavity is continuously monitored. Pressure responsive switches are utilized in conjunction with a gas leak monitoring circuit to monitor the pressure of the fluid medium in the tire cavity. If the pressure falls below a predetermined level, the heating and/or pressure media is terminated and a new tire is prevented from being put into the mold.

U.S. Pat. No. 4,222,721 merely discloses a method and apparatus for purging curing fluid from a bladder in a tire curing press.

U.S. Pat. No. 4,502,857 discloses a continuous monitoring system to determine the pressure within the mold cavity as the green tire expands. A resulting change in air pressure will be directed through a conduit to pressure sensors which determine if the bladder pressure is at the necessary level.

U.S. Pat. No. 4,721,590 discloses a method for determining the amount of time needed to blow down the steam in a tire curing press so that the tire will remain in the press for the shortest time possible. Pressure transducers communicate with the inside of the bladder and are connected to a blow down manifold. During the blow down period, a vacuum is applied to an inlet conduit which will further accelerate the loss of pressure in the bladder. A valve controls a venturi type pump which is connected to the inlet line.

U.S. Pat. No. 4,744,931 discloses the use of a shaping system for green tires having multiple curing presses that have a common exhaust manifold. Pressure transducers sense pressures in the bladders for a plurality of the presses. A programmable controller controls the presses with respect to the signals received in the pressure transducers. This system allows the correct amount of pressure to be determined for the proper curing of the tires within the tire molds.

As discussed above, nearly all of these prior art control systems use the pressure of the curing fluid for controlling the presses and for determining if a leak occurs, whereas the leak detector of the present invention uses the vacuum which is created within the bladder and connected piping during removal of the spent curing fluid for the leak detection means.

SUMMARY OF THE INVENTION

Objectives of the invention include providing an improved leak detection system for a tire curing press which immediately detects when a leak has developed in the curing press and/or piping system therefor, to prevent the loading of another green tire into the press and the resultant improperly cured tire.

A further objective is to provide such a leak detection system which uses a vacuum which is created during the removal of the spent curing fluid as the detection media, thereby avoiding use of the curing fluid as the detection media, as in the prior art leak detection systems, thus providing a system which is relatively clean, preventing foul up of the detecting system.

A still further objective of the invention is to provide such a leak detection system which is operable when the press is clear of a cured tire, which heretofore could block or affect the sensing mechanism, and which is believed more accurate and sensitive than prior art detection systems which use the curing pressure as the sensing media, and which will shut down a press prior to a new tire being inserted therein, and which will sense leaks in various parts of the system such as in the pipes, gaskets, etc. as well as in the curing bladder itself.

Another objective is to provide such a curing system which can be incorporated easily and inexpensively into the current control system of many existing curing presses in an extremely simple and inexpensive manner.

These objectives and advantages are obtained by the improved vacuum leak detection system for use in a press for curing a tire, which press has a cavity containing an elastomeric curing bladder; said system includes a fluid exhaust line communicating with the bladder for removing spent shaping fluid from within the bladder after a curing cycle; first means communicating with the fluid exhaust line for creating a vacuum within the bladder as the spent shaping fluid is being withdrawn; second means communicating with the fluid exhaust line for detecting the strength of the vacuum being created within the bladder by the first means; and third means communicating with the second means for providing a signal when the strength of the detected vacuum reaches a predetermined level.

BRIEF DESCRIPTION OF THE DRAWINGS

The preferred embodiment of the invention, illustrative of the best mode in which applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
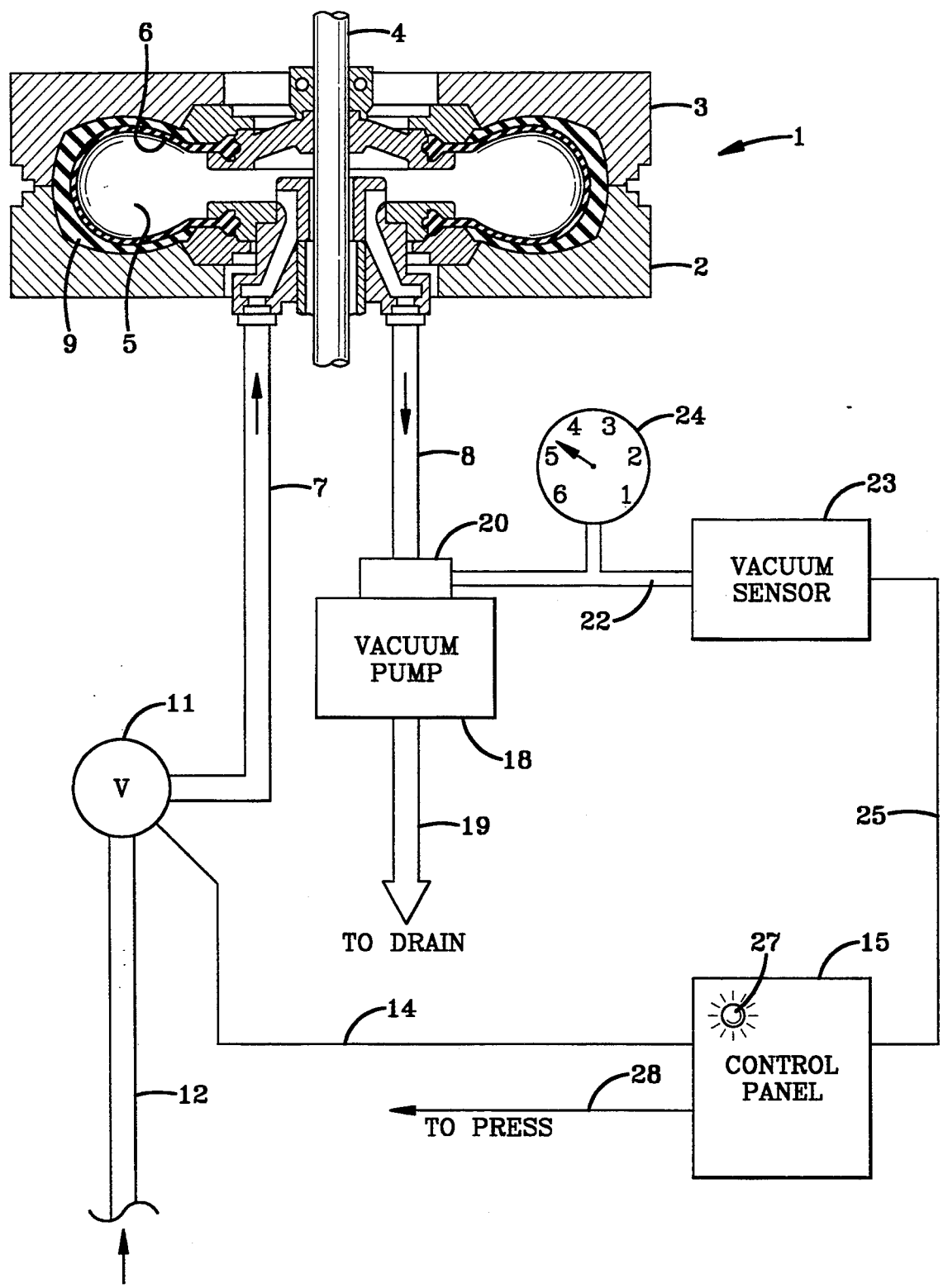
FIG. 1 is a diagrammatic schematic view showing the main elements of the leak detection system connected between a tire curing press and the control panel therefore.

FIG. 1 is a diagrammatic view showing the improved leak detection system of the present invention. A usual mold press indicated generally at 1, includes a fixed lower platen 2 and a movable upper platen 3. Platen 3 is vertically movable with respect to platen 2 on a control rod 4, by a usual press actuating mechanism for placing and removing a tire carcass 9 into and from the press cavity 5. A conventional elastomeric bladder 6 is mounted in the press cavity and communicates with a curing fluid inlet conduit 7 and with a fluid outlet conduit 8. Bladder 6 is shown in an inflated curing position pressing a green tire carcass 9 outwardly into engagement with the mold which forms the final tire configuration and tread pattern.

Inlet conduit 7 preferably communicates with a control valve 11 and to a source of curing fluid (not shown) which is connected to conduit 12. The curing fluid will usually consist of steam and water or other gaseous mixture which is heated to the necessary temperature prior to injection into the mold cavity for inflating bladder 6 into pressing engagement with carcass 9 in a usual curing cycle. Valve 11 is connected by a control line 14 to a usual press control panel 15. Outlet conduit 8 is connected to a usual vacuum pump 18, which in turn is connected through a drain line 19 to a usual drain (not shown). Vacuum pump 18 creates a vacuum in conduit 8 and correspondingly within the interior of bladder 6, upon the spent curing fluid being withdrawn from the bladder and discharged to the drain by vacuum pump 18. In a modified system which does not require a vacuum pump, a venturi device 20 communicates with bladder 6, as shown in FIG. 1, and creates a vacuum therein as the spent fluid passes through the device. The various components discussed above are all well known in the tire press curing art and therefore not discussed in detail.

In accordance with the invention, a vacuum line 22 is connected to venturi device 20 or vacuum pump 18, and is connected to a usual vacuum sensor 23 and a usual visual indicating vacuum gauge 24. Vacuum sensor 23 in turn is connected to control panel 15 by a line 25. Venturi device 20 is commonly referred to as a venturi ejector. U.S. Pat. No. 4,721,590 shows one general type of curing system with which the present invention may be utilized.

The operation of the improved vacuum leak detector is as follows. After a curing cycle has been completed, control valve 11 will be closed by conventional signal means from control panel 15, preventing the further flow of curing fluid through conduit 7. Vacuum pump 18 then is actuated and removes the spent curing fluid through conduit 8 and drain line 19 creating a vacuum in the bladder. In the modified system, the movement of the spent curing fluid through venturi device 20 automatically creates a vacuum within the bladder and in outlet conduit 8 and in line 22 which is connected to venturi device 20. The strength of the vacuum which is also present in vacuum line 22, will be displayed by vacuum gauge 24, usually in inches of mercury. Likewise, the strength of the vacuum is sensed by vacuum sensor 23, which is a readily known and available device, which will provide a signal, usually electrical or pneumatic, to control panel 15 upon the strength reaching a predetermined value, for example 4.8 inches of mercury within a predetermined time period, for example 15–30 seconds. The vacuum reaching such a predetermined level indicates that there is no leak in the bladder and piping system of the press. The signal is supplied by vacuum sensor 23 through line 25 to control panel 15 which will activate an indicating light 27, and will permit the appropriate control signal to be supplied to valve 11 through line 14 from control panel 15. This will also enable the appropriate control signal to be sent to press 1 through a control line 28 to start the next load cycle, with a subsequent signal being supplied to valve 11 to permit the flow of curing fluid through line 12 and conduit 7 into bladder 6 after a new green tire has been loaded into press 1 and upper platen 3 moved into a locked position with fixed lower platen 2.

In the event that the strength of the vacuum created in line 8 and correspondingly in line 22, does not reach the predetermined level, for example 4.8 inches of mercury, within a predetermined period of time, light 27 will not come on which will notify the operator that a leak exists somewhere in the system. Likewise, the appropriate press control signals to start another load cycle are not initiated by control panel 15. In the alternative, if a predetermined vacuum level or strength is not created within the predetermined time period, another indicating signal or alarm could be sounded if desired. The various control signals could be pneumatic, electrical, etc. without affecting the concept of the invention.

Therefore, in accordance with the invention, a simple leak detection system is provided by using the vacuum which is created by a vacuum pump or naturally created upon movement of spent curing fluid which is being drained from the press, past a venturi orifice of a venturi device present in many curing presses. Whereupon if a predetermined vacuum strength is not detected within a predetermined time period the required control signal will not be supplied to the control panel of the press, thereby preventing the start of the next load cycle. Therefore, in order to implement the present control system only a usual vacuum sensor and associated electrical or pneumatic control lines, are needed to be connected between the vacuum pump or vacuum device 20, and the control panel.

Accordingly, the improved vacuum leak detector and method is an extremely simple, inexpensive yet highly efficient means of determining whether a leak exists in a curing bladder and connected piping after each curing cycle has been completed which, if detected, will prevent the next load cycle from being initiated.

Accordingly, the improved vacuum leak detector and method is simplified, provides an effective, safe, inexpensive, and efficient device and method which achieves all the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vacuum leak detector is constructed and used, the characteristics of the construction, and the advantageous, new and useful results obtained; the new and useful structures, devices, elements, arrangements, parts and combinations, and method steps are set forth in the appended claims.

I claim:

1. An apparatus for detecting a fluid leak in a press for curing a tire having a cavity containing an elastomeric curing bladder to be deployed within a green tire to be cured, comprising:
   a) a fluid exhaust line communicating with the bladder for removing spent shaping fluid from within the bladder after a curing cycle;
   b) first means including a vacuum pump communicating with the bladder for creating a vacuum within the bladder as the spent shaping fluid is being withdrawn;
   c) second means communicating with the fluid exhaust line for detecting the strength of the vacuum created within the bladder by the vacuum pump; and
   d) third means communicating with the second means for providing a press control signal when the strength of the detected vacuum reaches a predetermined level for controlling the start of another curing cycle.

2. The press defined in claim 1 in which the second means is a vacuum sensor gauge connected to the exhaust line.

3. The press defined in claim 2 in which the third means is a visible alarm connected to the vacuum sensor gauge.

4. The press defined in claim 1 including control means for controlling the operation of the press; and in which the signal provided by the third means is supplied to the control means to permit operation of the press.

5. An apparatus for detecting a fluid leak in a press having an elastomeric bladder for curing an article placed within a cavity of the press, comprising:
   a) a fluid inlet line for supplying a curing fluid into the bladder;
   b) a fluid exhaust line communicating with the bladder for removing spent fluid from within the bladder;
   c) first means including a venturi ejector communicating with the bladder for creating a vacuum within the bladder as the spent curing fluid is being withdrawn from the bladder and moves past said venturi ejector;
   d) second means for detecting the strength of the vacuum created within the bladder by the first means; and
   e) third means communicating with the second means and controlled by the strength of the detected vacuum to prevent curing fluid from moving through the inlet line and into the bladder if the strength of the vacuum is below a predetermined amount to prevent the start of another curing cycle.

6. A method for detecting a fluid leak in a press used for shaping a green article with an elastomeric curing bladder into which a curing fluid flows for expanding the bladder, comprising the steps of:
   removing spent curing fluid from within the bladder after the article has been cured by a vacuum pump to create a vacuum within the bladder upon removal of the spent curing fluid;
   measuring the strength of the created vacuum; and
   providing a control signal to a control mechanism of the press depending upon the strength of the measured vacuum, to permit the control mechanism to actuate the press for another curing cycle.

7. The method defined in claim 6 including the step of providing a visual indication that a predetermined vacuum strength has been measured.

8. The method defined in claim 6 including the step of providing the control signal to the press control mechanism upon the vacuum strength reaching 4.8 inches of mercury.

* * * * *